(12) United States Patent
Kubota (10) Patent No.: US 6,971,035 B2
(45) Date of Patent: Nov. 29, 2005

(54) METHOD AND SYSTEM FOR REDUCING POWER CONSUMPTION OF A MULTI-FUNCTION ELECTRONIC APPARATUS THAT IS ADAPTED TO RECEIVE POWER FROM A HOST SYSTEM

(75) Inventor: Yoshiyasu Kubota, Kanagawa (JP)

(73) Assignee: Sony Corporation, (JP)

( * ) Notice: Subject to any disclaimer, the term of this patent is extended or adjusted under 35 U.S.C. 154(b) by 617 days.

(21) Appl. No.: 09/938,121

(22) Filed: Aug. 23, 2001

(65) Prior Publication Data

US 2002/0053036 A1 May 2, 2002

(30) Foreign Application Priority Data

Aug. 29, 2000 (JP) ............................ P2000-259274

(51) Int. Cl.[7] .............................................. G06F 1/26
(52) U.S. Cl. ..................................... 713/320; 713/324
(58) Field of Search ............................... 713/300, 320, 713/324, 322, 323; 710/8, 13, 14

(56) References Cited

U.S. PATENT DOCUMENTS

| | | | |
|---|---|---|---|
| 4,841,440 A | | 6/1989 | Yonezu et al. |
| 5,483,656 A | | 1/1996 | Oprescu et al. |
| 5,689,714 A | * | 11/1997 | Moyer ......................... 713/310 |
| 5,821,924 A | * | 10/1998 | Kikinis et al. ............... 345/212 |
| 5,832,280 A | * | 11/1998 | Swanberg .................... 713/300 |
| 5,996,083 A | | 11/1999 | Gupta et al. |
| 6,085,982 A | | 7/2000 | Nakashima |
| 6,105,141 A | | 8/2000 | Hanlon et al. |
| 6,131,166 A | * | 10/2000 | Wong-Insley ................ 713/300 |
| 6,266,711 B1 | * | 7/2001 | Ishikawa et al. ............... 710/8 |
| 6,307,281 B1 | * | 10/2001 | Houston ....................... 307/31 |

FOREIGN PATENT DOCUMENTS

| | | |
|---|---|---|
| EP | 0 522 483 A2 | 1/1993 |
| EP | 0 679 983 A2 | 11/1995 |
| EP | 0 833 252 A2 | 4/1998 |
| JP | 03-268013 A1 | 11/1991 |

* cited by examiner

*Primary Examiner*—A. Elamin
*Assistant Examiner*—Paul Yanchus, III
(74) *Attorney, Agent, or Firm*—Lerner, David, Littenberg, Krumholz & Mentlik, LLP

(57) ABSTRACT

A method of reducing power consumption without increasing the load of a host apparatus. A media controller connected to a system bus is provided in an external apparatus, such media controller being provided with, for example, a camera controlling circuit, a GPS controlling circuit and an interface connecting to an electronic apparatus. The electronic apparatus may include, for example, a GPS function block, a camera shooting function block and a memory function block. Such function blocks are connected to the interface through a register, thus exchanging data with the external apparatus. In addition, each of the function blocks has a power controlling unit and a power controlling signal is supplied from a system controlling circuit of the electronic apparatus to each of the power controlling units.

8 Claims, 6 Drawing Sheets

FIG.3

| ADDRESS | READ OUT REGISTER | WRITE REGISTER |
|---|---|---|
| 00 | | |
| 01 | INTERRUPT | |
| 02,03 | STATUS | |
| 04 | TYPE | TYPE |
| 05 | | |
| 06 | CATEGORY | CATEGORY |
| 07 | CLASS | |
| 08 | POWER REQUEST | FUNCTION VALIDATION |
| 09,0A | ATTRIBUTE INFORMATION LENGTH | |
| 0B~0F | UNDEFINED | UNDEFINED |
| 10 | | SYSTEM PARAMETER |
| 11~13 | | BLOCK ADDRESS |
| 14 | | COMMAND PARAMETER |
| 15 | PAGE ADDRESS | PAGE ADDRESS |
| 16 | BLOCK FLAG DATA | BLOCK FLAG DATA |
| 17 | BLOCK INFORMATION | BLOCK INFORMATION |
| 18,19 | LOGIC ADDRESS | LOGIC ADDRESS |
| 1A~2F | FORMULATION IN PROGRESS | FORMULATION IN PROGRESS |

FIG.4

| ADDRESS | READ OUT REGISTER | WRITE REGISTER |
|---|---|---|
| 00 | | |
| 01 | INTERRUPT | |
| 02,03 | STATUS | |
| 04 | TYPE | TYPE |
| 05 | | |
| 06 | CATEGORY | CATEGORY |
| 07 | CLASS | |
| 08 | POWER REQUEST | FUNCTION VALIDATION |
| 09,0A | ATTRIBUTE INFORMATION LENGTH | |
| 0B~0F | UNDEFINED | UNDEFINED |
| 10~15 | UNABLED | UNABLED |
| 16,17 | NOT USED | NOT USED |
| 18 | RATE | RATE |
| 19 | UART SETTINGS | UART SETTINGS |
| 1A | VOLUME OF REMAINING DATA | RECEPTION DATA LENGTH |
| 1B | FREE BUFFER SPACE | TRANSMISSION DATA LENGTH |
| 1C | | RECEPTION INTERRUPT |
| 1D | | TRANSMISSION INTERRUPT |
| 1E,1F | UART CLOCK | |
| 20 | GPIO INPUT STATUS | GPIO OUTPUT STATUS |
| 21~2F | FORMULATION IN PROGRESS | FORMULATION IN PROGRESS |

FIG.5

| ADDRESS | READ OUT REGISTER | WRITE REGISTER |
|---|---|---|
| 00 | INTERRUPT | |
| 01 | STATUS | |
| 02,03 | TYPE | |
| 04 | | TYPE |
| 05 | CATEGORY | |
| 06 | CLASS | CATEGORY |
| 07 | POWER REQUEST | |
| 08 | ATTRIBUTE INFORMATION LENGTH | FUNCTION VALIDATION |
| 09,0A | UNDEFINED | |
| 0B~0F | UNABLED | UNDEFINED |
| 10~15 | NOT USED | UNABLED |
| 16,17 | CAMERA CONTROLLER | NOT USED |
| 18 | RECEPTION DATA LENGTH | CAMERA CONTROLLER |
| 19 | FORMULATION IN PROGRESS | TRANSMISSION DATA LENGTH |
| 1A~2F | | FORMULATION IN PROGRESS |

FIG.6

METHOD AND SYSTEM FOR REDUCING POWER CONSUMPTION OF A MULTI-FUNCTION ELECTRONIC APPARATUS THAT IS ADAPTED TO RECEIVE POWER FROM A HOST SYSTEM

CROSS-REFERENCE TO RELATED APPLICATIONS

The present application claims priority from Japanese Application No. P2000-259274 filed Aug. 29, 2000, the disclosure of which is hereby incorporated by reference herein.

BACKGROUND OF THE INVENTION

The present invention relates to an electronic apparatus that can be freely attached to and/or detached from an external apparatus and is suitable for enabling an apparatus to realize an arbitrary function, and to an external apparatus using the same. More specifically, the present invention relates to an electronic apparatus having a shape, for example, equivalent to a memory card apparatus or a similar semiconductor memory apparatus, such electronic apparatus executing an arbitrary operation upon being connected to a connecting portion of the external apparatus, and to the external apparatus using the electronic apparatus.

It is proposed that an electronic apparatus having a shape equivalent to a memory card apparatus or a similar semiconductor memory apparatus that can be freely attached to and/or removed from an external apparatus may execute an arbitrary operation upon being connected to a connecting portion of such memory apparatus of an external apparatus. In other words, it is possible to easily expand the utility or application of an external apparatus by making such electronic apparatus have, for example, a computer network connecting function or an external communication function.

However, when utilizing such electronic apparatus connected to an external apparatus, the amount of power consumed by the external apparatus inevitably increases, so that an internal battery thereof is consumed in a short term as a result of such increase in power consumption, consequently making it difficult to have a long-term utilization by applying the battery. Such increase in power consumption is particularly remarkable when the electronic apparatus has multiple functions. As a result, an electronic apparatus conventionally has only one function, therefore making operations inconvenient as the electronic apparatus has to be changed every time a new function is required.

In view of such problem, it is possible to conceive a case in which, while multiple functions are provided to an electronic apparatus, a means for controlling power supply from the outside is also provided so that controlling is done so as to supply power only to a required function. However, such methodology is difficult to realize as it increases the load of the external apparatus as complex procedures are required for controlling the external apparatus, such as requiring controlling of an individual power supply each time a function is selected from the external apparatus.

SUMMARY OF THE INVENTION

The present invention has been conceived in view of such problems, that is, when using a conventional apparatus by attaching an electronic apparatus of multiple functions to an external apparatus, long term utilization through a battery is difficult to realize as the internal battery is consumed in a short term as a result of the increase in power consumption due to presence of the multiple functions. In addition, when controlling power supply from the external apparatus, each time a function is selected, the processing required for the external apparatus becomes complicated.

According to a preferred embodiment of the present invention, the electronic apparatus is provided with a circuit for reducing the power consumption when a function block is not selected and, as a result, it is possible to reduce the power consumption by reducing the power consumption of the electronic apparatus to the minimum required through a simple structure. Accordingly, it is possible to utilize the internal battery for an extended period of time and also without increasing the burden of processing at the external apparatus.

According to another embodiment of the present invention, it is possible to change over functions through a simple structure in which it is enough just to change the content of a setting register according to the selection of a function block of the electronic apparatus, such selection being determined by writing related data into a function register.

BRIEF DESCRIPTION OF THE DRAWINGS

The foregoing and other objects, features and advantages of the present invention will be apparent to those skilled in the art from the following description of the presently preferred exemplary embodiments of the invention taken in connection with the accompanying drawings, in which.

DETAILED DESCRIPTION

According to a preferred embodiment of the present invention, there is proposed an electronic apparatus for performing an arbitrary function that can be freely attached to and detached from an external apparatus, while performing exchange of arbitrary data with the external apparatus; such electronic apparatus has a plurality of function blocks plus a means for turning down power consumption during application of power and for a function block that is not selected.

In addition, according to another preferred embodiment of the present invention, there is proposed an external apparatus using an electronic apparatus for performing an arbitrary function, to which the electronic apparatus can be freely attached and detached, while performing exchange of arbitrary data with the electronic apparatus; such electronic apparatus has a means for writing information regarding utilization on a function register common to a plurality of function blocks provided in the electronic apparatus, as well as a means for writing set up data of an arbitrary function on a designated register corresponding to the function block determined as selected according to the information written in the function register.

Figure 1:
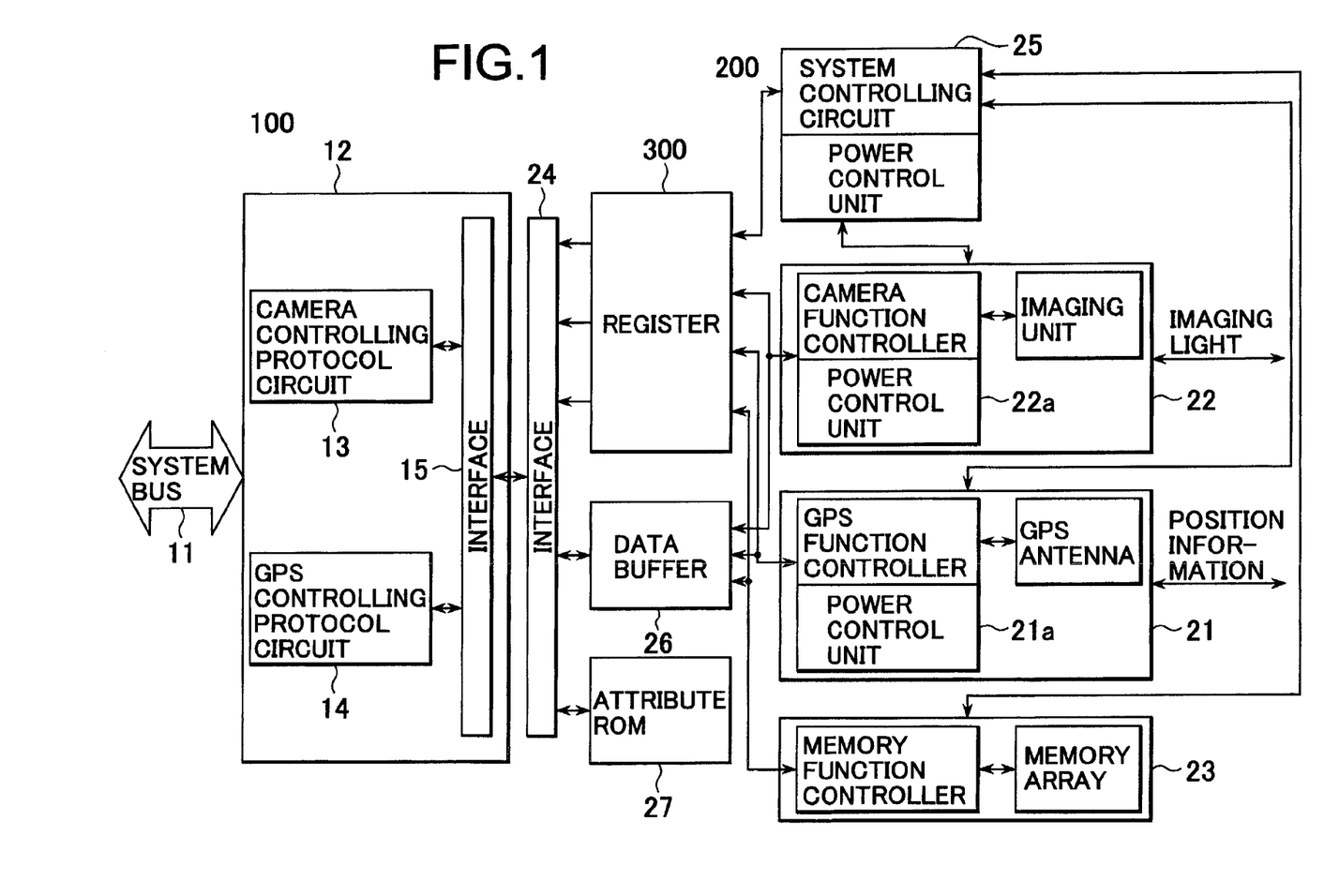
FIG. 1 is a block diagram of an electronic apparatus and an external apparatus according to a preferred embodiment of the present invention.

The preferred embodiments of the present invention are explained below with reference to the drawings, in which FIG. 1 represents an electronic apparatus according to a preferred embodiment of the present invention, as well as the structure of an external apparatus constituting another preferred embodiment of the present invention using the electronic apparatus.

The left portion of FIG. 1 shows, as an external apparatus using the electronic apparatus, an external apparatus 100 such as, for example, a personal computer. Such external apparatus 100 is provided with a media controller 12 connected to a system bus 11 and, in such media controller 12, there is provided, for example, a camera controlling protocol circuit 13, a GPS (Global Positioning System: a satellite-based positioning system) controlling protocol circuit 14, and an interface 15 connected to the electronic apparatus.

Figure 2:
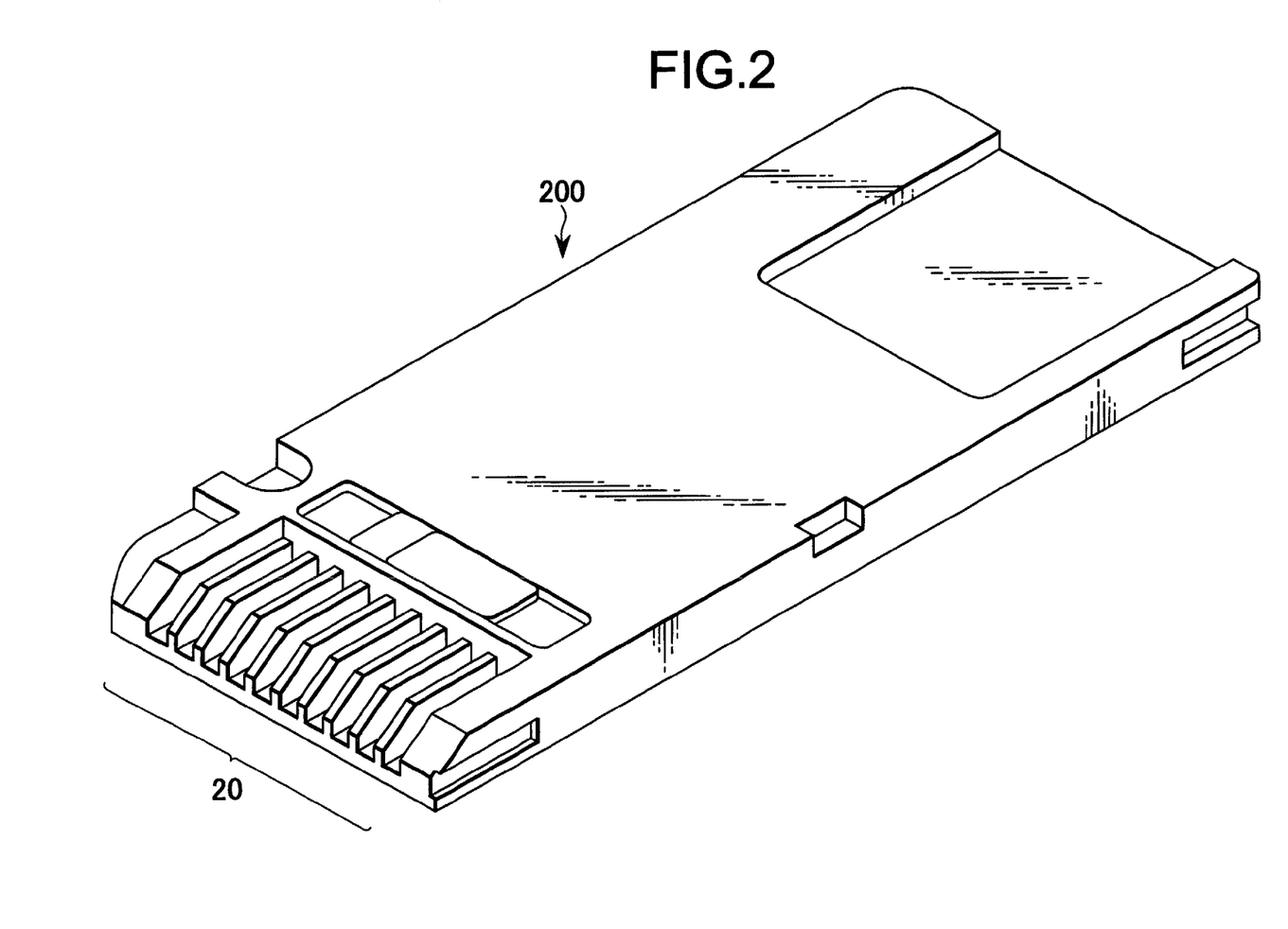
FIG. 2 is an outline view of an electronic apparatus according to a preferred embodiment of the present invention.

On the other hand, the right portion of FIG. 1 shows an electronic apparatus 200. Such electronic apparatus 200 has a configuration similar to a so-called memory card apparatus as shown in FIG. 2, or a semi-conductor memory apparatus of similar type. In addition, while being able to be freely attached to and detached from a memory card slot of the external apparatus 100, the electronic apparatus 200 can be electrically connected to the interface 15 of the media controller 12 of the external apparatus 100 via a connector cluster 20 formed on an end thereof.

The electronic apparatus 200 is provided with a plurality of functions. As far as the present preferred embodiment as one of several possible embodiments of the present invention is concerned, there is provided, for example, a GPS function block 21 as a function A, a camera shooting function block 22 and a memory function block 23 as a function B. Moreover, such function blocks 21 to 23 are connected to an interface 24 connected to the connector cluster 20 mentioned above via a register 300, thus permitting exchange of data with the external apparatus 100.

Furthermore, for each of the function blocks 21 and 22 there is provided respective power controlling portions 21a and 22a. In addition, a power-control signal from a system controlling circuit 25 connected to the register 300 is supplied to the power controlling portions 21a and 22a. As a result, by providing such an electronic apparatus 200 that can be freely attached to and detached from the external apparatus 100, it is possible to supply power between the media controller 12 of the external apparatus 100 and the register 300 of the electronic apparatus 200, as well as exchange data through a data buffer 26.

In addition, the register 300 is provided for the system including the external apparatus 100 and the electronic apparatus 200. Such register 300 includes, for example, addresses from "00" to "FF" ("- -" indicates a hexadecimal number), and both a read out register and a write register of 2 bytes each are provided for each address. To the read out register, information contained inside the electronic apparatus 200 is read out, while to the write register, information from the external apparatus 100 is written.

Figure 3:
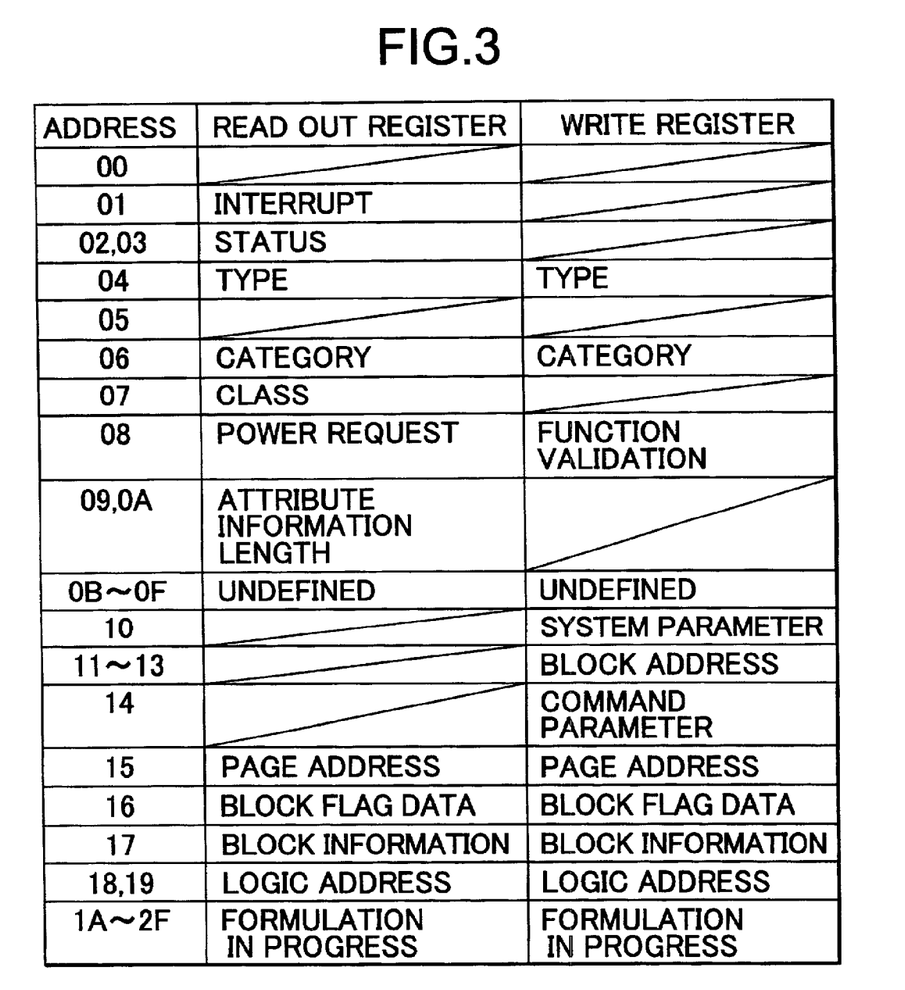
FIG. 3 is a table describing the electronic apparatus according to the preferred embodiment of the present invention.

First of all, an address structure of a memory function of the register 300 is shown in FIG. 3. That is, in FIG. 3, address "00" is not used, while a read out register of address "01" is an interrupt register and the read out register of addresses "02" and "03" is a status register. Furthermore, write registers of addresses "01" to "03" are not used, while both read out and write registers of address "04" are type registers. In addition, address "05" is not used.

Moreover, the read out and the write registers of address "06" are category number registers that show a function to be executed inside the electronic apparatus 200. In addition, the read out register of address "07" is a class number register, while the write register of address "07" is not used. Furthermore, the read out register of address "08" is a power request register, while the write register thereof is a function validation register.

In addition, the read out registers of addresses "09" and "0A" are registers for attribute information length. Attribute information is stored in an attribute ROM 27 inside the electronic apparatus 200 and, when the electronic apparatus has a memory function that enables writing, such attribute information is read out from the attribute ROM 27 and stored in the memory function described above at the time of factory delivery. As a consequence, for an ordinary communication other than at the time of factory delivery, attribute information stored in the memory function is read out and access to the attribute ROM 27 is forbidden. Nevertheless, when the electronic apparatus does not have a memory function, the attribute information stored in the attribute ROM 27 is read out by the host, even for an ordinary access.

Still further, the write register of address "10" is a system parameter register, while the write register of addresses "11" to "13" is a block address register. Still further, the write register of address "14" is a command parameter register. In addition, the read out registers of addresses "10" to "14" are not used. Moreover, the read out register and the write register of address "15" are page address registers.

In addition, the readout register and the write register of address "16" are block flag data registers. Further, the read out register and the write register of address "17" are block information registers. In addition, the read out registers and the write registers of addresses "18" and "19" are logic address registers. Moreover, a format for addresses "1A" to "2F" is currently under process of formulation.

Figure 4:
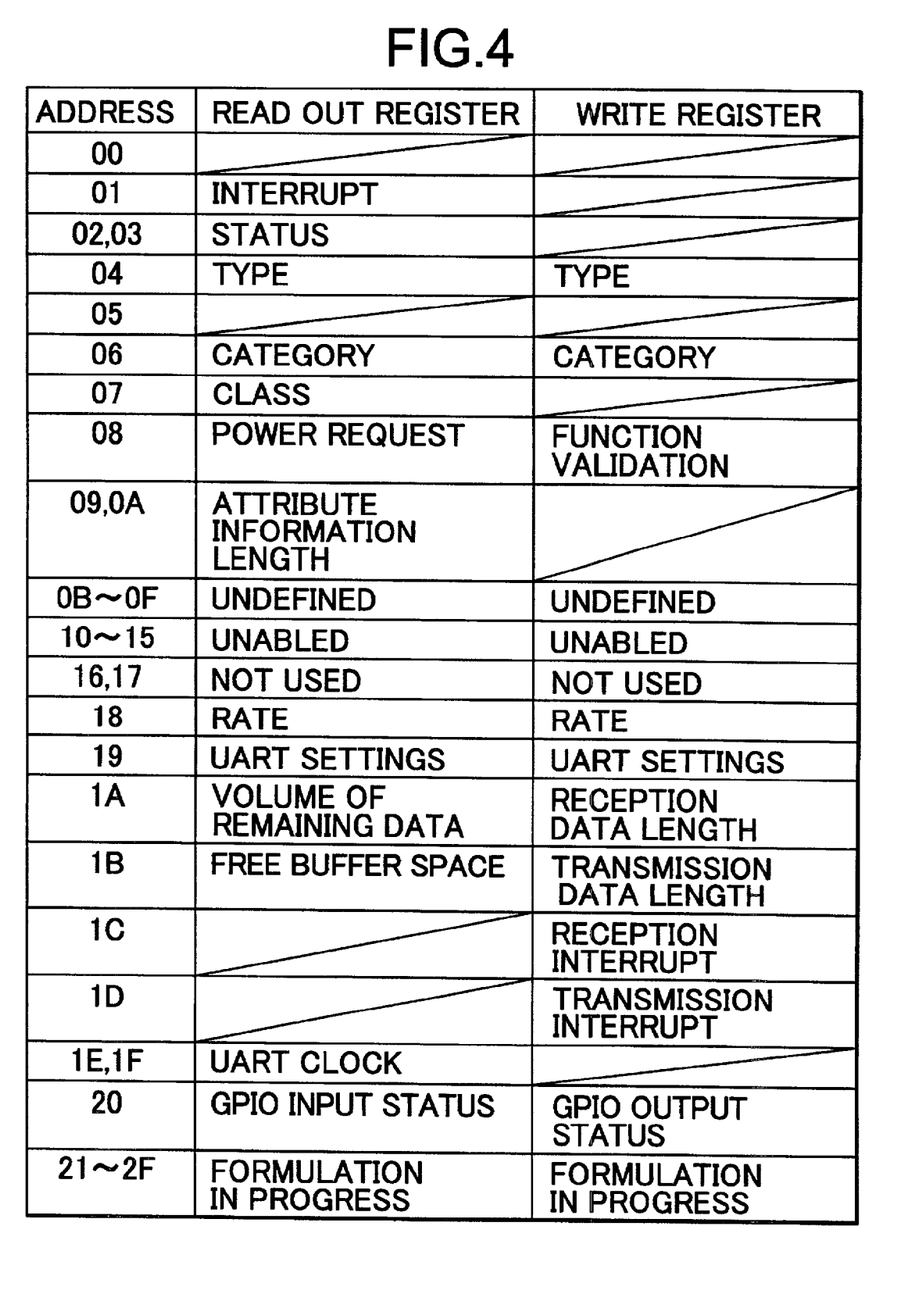
FIG. 4 is another table describing the electronic apparatus according to the preferred embodiment of the present invention.

On the other hand, an address structure for the GPS function is as shown in FIG. 4. Furthermore, the GPS function block has a GPS antenna for receiving positioning information and a GPS function controller. The GPS controller includes units such as a UART (Universal Asynchronous Receiver-Transmitter), a FIFO (First In First Out) buffer and a power controlling unit. In other words, structures of addresses from "00" to "0F" in FIG. 4 are the same as for the memory function. In addition, as for the GPS function, addresses from "10" to "15" have access disabled. Moreover, addresses from "16" to "17" are not used. Further, the read out register and the write register of address "18" are registers for setting transmission speed of information data between the external apparatus 100 and the electronic apparatus 200. In addition, address "19" is a register showing a status of a Universal Asynchronous Receiver-Transmitter (hereinafter referred to simply as UART), which performs change of a digital data signal transmitted and received through an antenna, from serial to parallel, or vice-versa.

In addition, the read out register of address "1A" is a register showing a volume of data remaining in a First In First Out (hereinafter referred to simply as FIFO) memory at the receiving side, which buffers a difference in data transmission speed, while the read out register of address "1B" is a register showing a volume of free buffer space of the FIFO memory at the transmitting side. Moreover, the write register of address "1A" is a data length register of data received from the external apparatus 100, while the write register of address "1B" is a data length register of data sent to the external apparatus 100.

In addition, the write register of address "1C" is a register for generating an interrupt when the volume of data accumulated in the FIFO memory at the receiving side reaches a designated number of bytes, while the write register of address "1D" is a register for generating an interrupt when the volume of data accumulated in the FIFO memory at the transmitting side is below a preset value. Furthermore, in any case, the value "0" is invalid. In addition, the readout registers of both addresses "1C" and "1D" are not used.

In addition, the read out registers of addresses "1E" and "1F" are registers showing clock values of UART, while the write registers thereof are not used. Furthermore, the read out register and the write register of address "20" are registers for controlling/monitoring respective universal digital I/O terminals provided on the electronic apparatus 200. Moreover, addresses "21" to "2F" are in a stage of having their formats designed. The settings for the GPS function are thus set as above, as an example.

Figure 5:
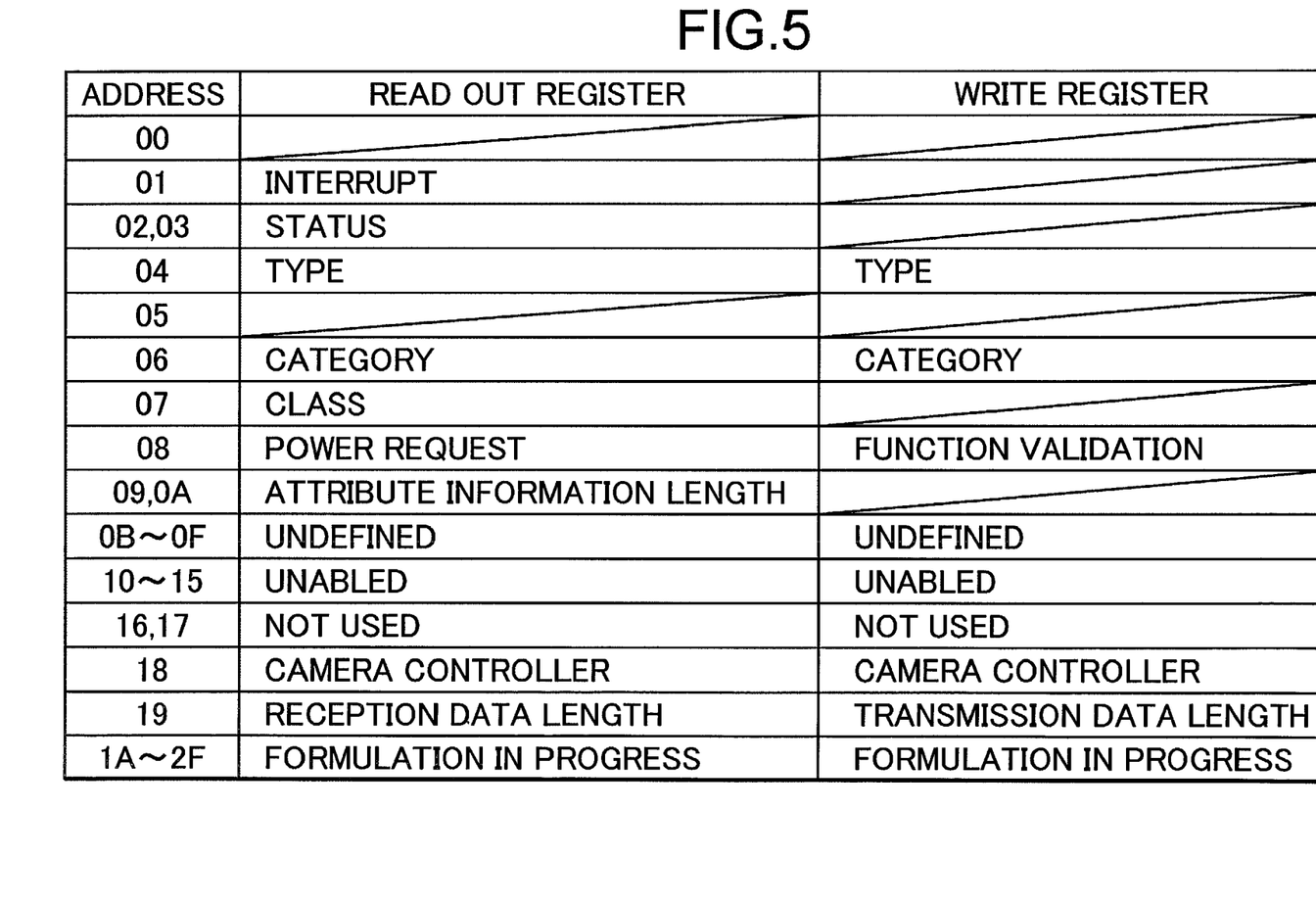
FIG. 5 is another table describing the electronic apparatus according to the preferred embodiment of the present invention.

Moreover, an address structure for a camera function can be set as shown, for example, in FIG. 5. It is to be understood that the camera function block includes a shooting unit having, for example, a lens or a CCD for receiving shooting light coming from an object of shooting, as well as a camera function controller. The camera function controller includes a power controlling unit, a shooting signal processing unit and the like. As a result, the structures of addresses from "00" to "0F" in FIG. 5 are similar to the structures for the memory function. In addition, as for the camera function, addresses from "10" to "15" have access disabled.

Moreover, addresses "16" and "17" are not used. Also, the read out register and the write register of address "18" are registers for controlling the camera. Furthermore, the read out register of address "19" is a register for length of data received from the external apparatus 100, while its write register is a register for length of data sent to the external apparatus 100.

In addition, the camera function controller, the GPS function controller and the memory function controller each have their own power controlling functions controlled by a power controlling unit of a system controlling circuit and, when not used, such function is set to a sleeping mode (a status in which a controller clock is stopped), thus reducing power consumption. Furthermore, this may apply to an arbitrary information apparatus, an apparatus for connecting to a network (e.g., LAN) of a designated range (e.g., Ethernet) or the like, an arbitrary modem apparatus, a communication apparatus commonly recognized by Japanese, Americans and Europeans (such as a Bluetooth compatible apparatus) or the like, or an arbitrary serial communication function or the like.

Moreover, when, for example, changing over a function to be performed by the electronic apparatus 200 through the external apparatus 100, first a desired function code (a category number) is written into the write register of the address "06" mentioned above. Accordingly, the function code (category number) written into such write register of address "06" is read out to the system controlling circuit 25 of the electronic apparatus 200, whereby a function requested from the external apparatus 100 can be recognized by the electronic apparatus 200.

In addition, a control signal for activating, for example, the function block 21 or the function block 22 is formed in the system controlling circuit 25 in order to make such recognized function be executed by the electronic apparatus 200. In other words, the address structure of register 300 is changed over according to the recognition mentioned above. Moreover, the function requested by the external apparatus 100 is performed by the electronic apparatus 200 by providing the control signal formed in the system controlling circuit 25 to each of respective power control units 21a and 22a of function blocks 21 or 22 using register 300.

Furthermore, a class number related to, for example, a version of a function performed by the electronic apparatus 200 is read out to the read out register of address "07", along with reading out a function code (a category number) of a function performed by the electronic apparatus 200 to the read out register of address "06". Moreover, by recognizing this category number and the class number at the external apparatus 100, a function to be performed by the electronic apparatus 200 is recognized. As a result, a driver or the like is activated at the external apparatus 100.

The change over of a function to be performed by the electronic apparatus 200 is, therefore, done by, for example, writing a code related to a desired function (a category number) from the external apparatus to the write register of address "06". Then, by reading out the function code (category number) related to the function to be performed by this electronic apparatus 200 to the read out register of address "06", the function to be performed by the electronic apparatus 200 is recognized by the external apparatus 100, thereby allowing a smooth change over of functions.

In other words, if, for example, a function written from the external apparatus 100 to the write register of address "06" is not available at the electronic apparatus 200, as the function code (category number) cannot be read out to the read out register of address "06", it is recognized by the external apparatus 100 that the desired function is not available at the electronic apparatus 200. As a result, a procedure like a discontinuation of such function by the external apparatus can be performed smoothly.

Figure 6:
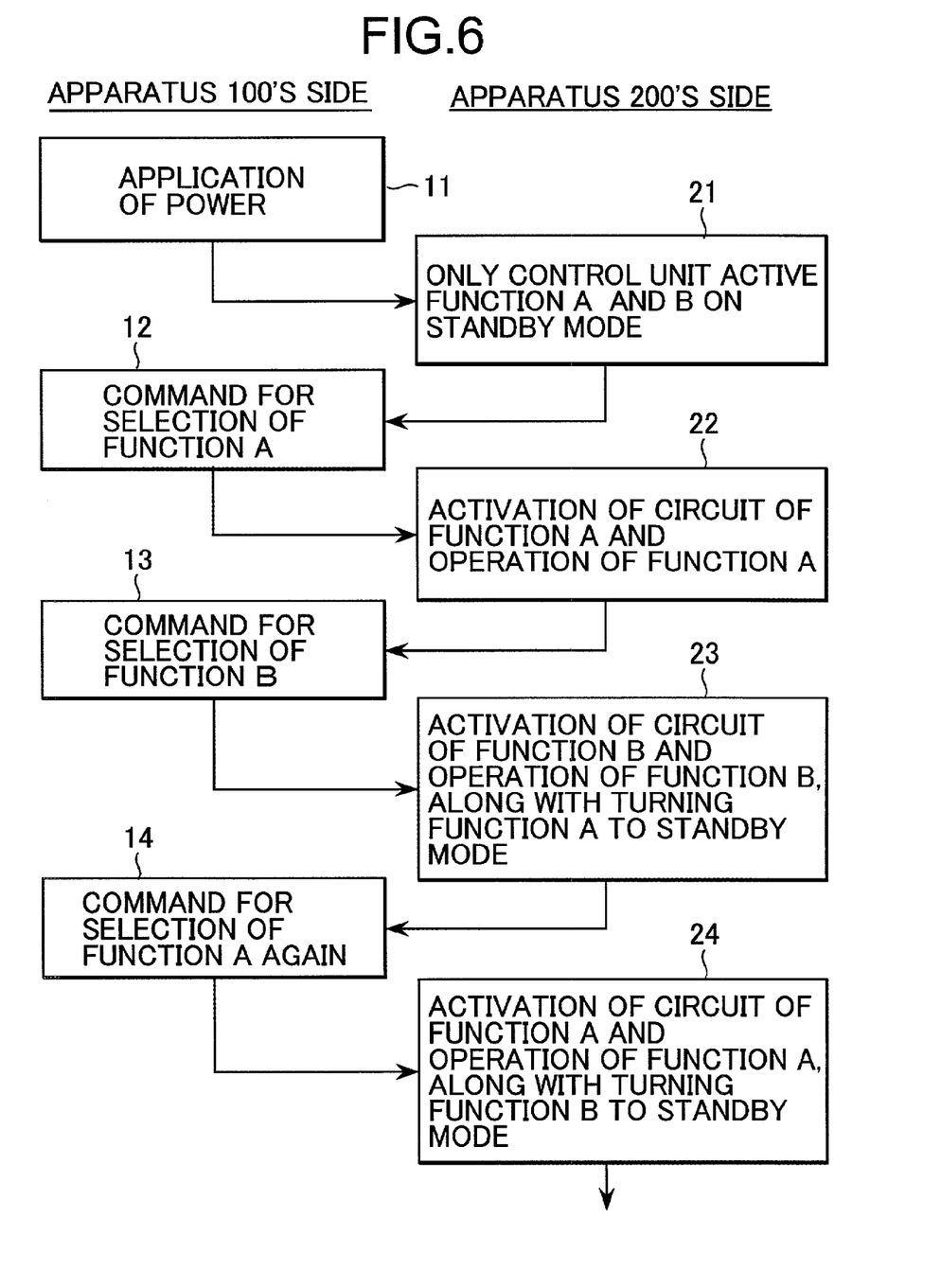
FIG. 6 is a flowchart describing an operation of the electronic apparatus according to the preferred embodiment of the present invention.

In addition, an action such as the one shown in the flowchart of FIG. 6 can be performed as against such system including the external apparatus 100 and the electronic apparatus 200. In other words, in FIG. 6, upon applying power to the external apparatus 100 in step [11], the electronic apparatus 200 goes to step [21]. Then, at such step [21], only the system controlling circuit 25 is turned to active mode, while the function A of function block 21 and the function B of function block 22 are turned to a standby mode.

On the other hand, if a command for using the function A is issued at the external apparatus 100 side in step [12], the electronic apparatus 200 turns to step [22], in which the function A operates as the function block 21 is activated. In addition, if a command for using the function B is issued at the external apparatus 100 side in step [13], the electronic apparatus 200 turns to step [23]. Then, in such step [23], the function B operates as the function block 22 is activated, while the function block 21 of function A is turned to standby mode.

In addition, if the command for using the function A is issued again at the external apparatus 100 side in step [14], the electronic apparatus 200 turns to step [24]. Then, in such step [24], the function A operates as the function block 21 is activated, while the function block 22 of function B is turned to standby mode. By proceeding like that, the function A or B each can be performed as desired at the electronic apparatus 200 side according to the issuance of a command at the external apparatus 100 side for using either the function A or B.

Moreover, as for such operations, instep [21] mentioned above, supposing that, for example, an amount of electric current consumed by block 21 and 22, for instance, during standby mode is 10 mA each and the amount of electric current consumed by the system controlling circuit 25 is 30 mA, then the amount of electric current consumed by the electronic apparatus 200 is 10+10+30=50 mA.

On the other hand, as for steps [22] and [24], supposing that, for example, an amount of electric current consumed by block 21 during operation mode is 100 mA, the amount of electric current consumed by the electronic apparatus 200 is 100+10+30=140 mA.

In addition, in step [23], if , for example, the amount of electric current consumed by function block 22 during operation mode is 60 mA, the amount of electric current consumed by the electronic apparatus 200 is 10+60+30=100 mA.

In other words, considering the system including the external apparatus 100 and the electronic apparatus 200, the amounts of electric current consumed at the electronic apparatus 200 side are, respectively, 50 mA at step [21], 140 mA at steps [22] and [24], and 100 mA at step [23]. This is a small amount of current consumption when compared to a case in which the function blocks 21 and 22 are both in the operation mode, thus having 100+60+30=190 mA.

In such case, it is possible for the external apparatus 100 to establish power control over each of function blocks 21 and 22 by simply writing data onto register 300 of the electronic apparatus 200. Also, it is possible to establish power control over the function blocks 21 and 22 from the electronic apparatus 200 by looking at data contained in the register 300, thus constituting an extremely simple structure which permits establishment of easy power control.

Such values of electric current consumption are indicated, for example, in the read out register of address "08" as a current request from the electronic apparatus 200 side. The read out register of address "08" is read out by the external apparatus 100 and, upon deciding whether such requested current is within an acceptable range, a function validation flag is set to the write register of the same address "08". As a result, it is possible to perform only a function that can be activated by the electronic apparatus 200. Moreover, the least significant bit of the write register is a power saving bit. Thus, by writing 1 to such bit, a power saving mode is set and, by writing 0 thereto, the power saving mode is released.

As the register 300 is conventionally provided for performing settings for each of function blocks 21 and 22 from the external apparatus 100, the preferred embodiment of the present invention makes a portion of this register 300 available for common use and establishing the address "06" as the function register, while allowing performance of a smooth setting of each function through its easy structure, as the address structure of a register to be set can be changed over for each function.

Accordingly, in the preferred embodiments of the present invention described above, by providing at the electronic device a means for reducing the power consumption of a function block when such block is not selected, the power consumption of the electronic device can be reduced to a minimum necessary by a simple structure, thus controlling an increase in power consumption, and while permitting an extension of hours of use of an internal battery, the external apparatus does not have to cope with a burden of additional processing.

In a conventional apparatus, when using an electronic apparatus having a plurality of functions that is attached to an external apparatus, an internal battery thereof is consumed in a relatively short period of time as the power consumption increases due to the plural functions thereof, thus making it difficult to operate for an extended time utilizing the battery. In addition, the preferred embodiments of the present invention permit an easy solution for the problem in the related art, namely, of controlling power supply for each selected function from the external apparatus, that is not easy to realize as the burden of processing increases for the external apparatus.

Furthermore, although in the preferred embodiments of the present invention selection of functions is described for a choice of 2 between A and B, a selection among 3 or more choices is also possible. In such case, it is possible to establish a plurality of functions to be selected accordingly. Conversely, if it is desired to limit utilization of a function block to exclusively 1 at a time, this can be easily set just by indicating the selected function from the external apparatus and performing a procedure of reducing the power consumption of functions other than the one that has been selected.

Moreover, according to the preferred embodiments of the present invention, as the electric current flowing between the external apparatus and the electronic apparatus can be reduced, it is possible to utilize inexpensive specifications such as endurance specs for connectors, terminals or the like.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus adapted for connection to a host system and for receiving electric power from the host system, the apparatus comprising:
   a plurality of function blocks, each function block performing a specified function when selected by the host system;
   a circuit operable to control each said function block selected by the host system to consume power at an operating rate and to control each said function block not selected by the host system to consume at least some power at a standby rate less than said operating rate; and
   a function register coupled between each of said plurality of function blocks and said circuit, said function register including an address structure that is configurable based on the specified function selected by the host system.

2. The apparatus according to claim 1, further comprising:
   a function code identifying each of said plurality of function blocks;
   wherein said function register stores said function code for each said function block selected by the host system, and said circuit is operable to control each said function block whose function code is stored in said function register to consume power at said operating rate and to control each said function block whose function code is not stored in said function register to consume power at said standby rate.

3. An apparatus adapted for connection to a host system and for receiving electric power from the host system, the apparatus comprising:
a plurality of function blocks, each function block performing a specified function when selected by the host system;
a function code identifying each of said plurality of function blocks;
a circuit operable to control each of said plurality of function blocks selected by the host system to consume power at an operating rate and to control each of said plurality of function blocks not selected by the host system to consume at least some power at a standby rate less than said operating rate; and
a register common to said plurality of function blocks, said register including a write area and a read area distinct from said write area, said register storing said function code for each said function block selected by the host system in said write area and a power save value indicating that a power save mode has been selected by the host system in said read area;
said circuit being operable to control each said function block whose function code is not stored in said register to consume power at said standby rate when said power save value is stored in said register.

4. A data processing system, comprising:
an apparatus for performing at least one function; and
a host system for supplying electric power to said apparatus;
said apparatus including:
a plurality of function blocks, each function block performing a specified function when selected by said host system;
a function code identifying each of said plurality of function blocks;
a function register common to said plurality of function blocks, said function register including a write area and a read area distinct from said write area, said function register storing said function code for each said function block selected by said host system in said write area; and
a circuit operable to control each said function block whose function code is stored in said write area to consume power at an operating rate and to control each said function block whose function code is not stored in said write area to consume power at a standby rate greater than zero and less than said operating rate; and
said host system including a writing unit operable to write said function code for each said function block selected by said host system into said write area.

5. A data processing system, comprising:
an apparatus for performing at least one function; and
a host system for supplying electric power to said apparatus;
said apparatus including:
a plurality of function blocks, each function block performing a specified function when selected by said host system;
a function code identifying each of said plurality of function blocks;
a register common to said plurality of function blocks, said register storing said function code for each said function block selected by said host system and a power save value indicating that a power save mode has been selected by said host system, said register including an address structure that is configurable based on the function selected by said host system; and
a circuit operable to control each said function block whose function code is stored in said register to consume power at an operating rate and to control each said function block whose function code is not stored in said register to consume power at a non-zero rate less than said operating rate when said power save value is stored in said register.

6. The data processing system according to claim 5, wherein said host system includes a writing unit operable to write said function code for each said function block selected by said host system and said power save value into said register.

7. In a data processing system including a host system and an apparatus for performing functions, the apparatus including a plurality of function blocks and a register common to the plurality of function blocks and having a write area and a read area distinct from the write area, each function block being identified by a function code and performing a specified function when selected by the host system, a method of controlling power consumption of the apparatus, comprising:
supplying electric power from the host system to each of the plurality of function blocks at a standby rate of consumption;
operating the host system to select a function block from among the plurality of function blocks;
controlling the host system to send the function code of the selected function block to the apparatus;
controlling the apparatus to write the function code of the selected function block to the write area of the register; and
reading the function code of the selected function block from the read area of the register and controlling power consumption of the plurality of function blocks so that the selected function block consumes power at an operating rate of consumption greater than said standby rate of consumption and each said function block whose function code is not stored in the register consumes power at said standby rate of consumption.

8. In a data processing system including a host system and an apparatus for performing functions, the apparatus including a plurality of function blocks, each function block performing a specified function when selected by the host system, a method of controlling power consumption of the apparatus, comprising:
supplying electric power from the host system to each of the plurality of function blocks at a standby rate of consumption;
operating the host system to select a function block from among the plurality of function blocks;
controlling the host system to send a notification to the apparatus identifying the selected function block;
storing the notification in a write register;
reading a value associated with the stored notification from a read register distinct from the write register; and
controlling power consumption of the plurality of function blocks based on the read value so that each function block not selected by the host system consumes power at the standby rate of consumption and the selected function block consumes power at an operating rate of consumption greater than the standby rate of consumption.

* * * * *